(12) United States Patent
Heath et al.

(10) Patent No.: US 9,336,101 B1
(45) Date of Patent: *May 10, 2016

(54) BACK-UP POWER FOR A NETWORK SWITCH

(71) Applicant: Google Inc., Mountain View, CA (US)

(72) Inventors: Taliver Brooks Heath, Mountain View, CA (US); Shawn M. Ledbetter, Mountain View, CA (US); Bob Felderman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/079,921

(22) Filed: Nov. 14, 2013

Related U.S. Application Data

(63) Continuation of application No. 13/075,386, filed on Mar. 30, 2011, now Pat. No. 8,595,550.

(51) Int. Cl.
*G06F 11/00* (2006.01)
*G06F 11/20* (2006.01)

(52) U.S. Cl.
CPC .................. *G06F 11/2015* (2013.01)

(58) Field of Classification Search
USPC ......................................................... 714/14
See application file for complete search history.

(56) References Cited

U.S. PATENT DOCUMENTS

| | | | |
|---|---|---|---|
| 6,507,172 B2 | 1/2003 | Sherman | |
| 6,664,758 B2 | 12/2003 | Yang | |
| 7,203,849 B2 * | 4/2007 | Dove | ............................. 713/300 |
| 7,552,350 B2 | 6/2009 | Fung | |
| 8,004,245 B2 | 8/2011 | Tsai | |
| 8,193,780 B2 | 6/2012 | Hussain et al. | |
| 8,205,102 B2 | 6/2012 | Kabbara et al. | |
| 2002/0004913 A1 | 1/2002 | Fung | |
| 2003/0200473 A1 | 10/2003 | Fung | |
| 2005/0254490 A1 * | 11/2005 | Gallatin | ......................... 370/389 |
| 2007/0254609 A1 * | 11/2007 | Rosenthal | .................. 455/127.1 |
| 2010/0171602 A1 * | 7/2010 | Kabbara | ......................... 340/333 |
| 2011/0276824 A1 * | 11/2011 | Cheung | ............................ 714/14 |
| 2012/0023340 A1 * | 1/2012 | Cheung | ............................ 713/300 |
| 2012/0228936 A1 | 9/2012 | Kabbara et al. | |

* cited by examiner

*Primary Examiner* — Kamini Patel
(74) *Attorney, Agent, or Firm* — Fish & Richardson P.C.

(57) ABSTRACT

A network switch includes a power connection configured to receive power from a primary power source and at least two ports. At least a first one of the ports is configured to connect to a first network interface of a first computing device through a communication medium configured to conduct operating power for the network switch. The first network interface is configured to draw electrical power from a power supply of the first computing device and provide, through the network cable, at least a portion of the drawn electrical power as the operating power. A switching circuit is configured to route network data between the ports and a power management circuit coupled at least to the first port. The power management circuit is configured to draw at least a portion of the operating power from the first port, and power the switching circuit using the drawn power responsive to a detected failure of the primary power source.

19 Claims, 5 Drawing Sheets

BACK-UP POWER FOR A NETWORK SWITCH

CLAIM OF PRIORITY

This application is a continuation of, and claims priority under 35 USC §119(e) to U.S. patent application Ser. No. 13/075,386, filed on Mar. 30, 2011, the entire content of which is hereby incorporated by reference.

TECHNICAL FIELD

This document relates to providing power for network elements.

BACKGROUND

Network switches connect multiple computing devices together to provide communication between the devices. Switches require power in order to operate. Secondary power sources such as uninterruptible power supplies (UPS) can be connected to the switches to allow continuous operation during power outages.

SUMMARY

In one aspect, a network switch includes a power connection configured to receive power from a primary power source and at least two ports. At least a first one of the ports is configured to connect to a first network interface of a first computing device through a communication medium configured to conduct operating power for the network switch. The first network interface is configured to draw electrical power from a power supply of the first computing device and provide, through the network cable, at least a portion of the drawn electrical power as the operating power. The network switch also includes a switching circuit configured to route network data between the at least two ports, and a power management circuit coupled at least to the first port. The power management circuit is configured to draw at least a portion of the operating power from the first port, and power the switching circuit using the drawn power from the first port responsive to a detected failure of the primary power source.

In another aspect, a computing device includes a power supply configured to provide electrical power to the computing device, and a network interface. The network interface is configured to connect to a port of a network switch through a communication medium configured to conduct operating power. The network interface is further configured to draw electrical power from the power supply of the computing device and provide at least a portion of the drawn electrical power to the network cable as operating power. A power management circuit coupled to the port of the network switch is able to draw at least a portion of the operating power from the network cable and power the network switch using the drawn operating power responsive to a detected failure of the primary power source.

In another aspect, a system includes a first computing device including a network interface circuit and a power supply. The system also includes a network switch configured to receive power from a primary power source. The network switch includes at least a first port connected to the network interface through a first network cable configured to conduct operating power. The network interface circuit is also configured to draw electrical power from the power supply of the first computing device and provide at least a portion of the drawn electrical power to the first network cable as operating power. The system also includes a power management circuit coupled to the first port on the network switch. The power management circuit configured to draw at least a portion of the operating power from the first port, and power the network switch using the drawn power when the primary power source fails to provide power that meets a power requirement of the network switch.

In another aspect, a method of providing uninterruptible power to a network switch connected to one or more computing devices includes detecting a failure of a primary power source of the network switch to provide at least a portion of a power requirement of the network switch. The method also includes, in response to detecting the failure, drawing, by a power management circuit, electrical power from at least one network cable that is connected to a port of the network switch and a network interface of a computing device. The electrical power drawn from the network cable is provided by a power supply of the computing device. The method further includes providing the drawn electrical power to components of the network switch such that the network switch continues to operate for a period of time after the detection of the failure.

Implementations can include one or more of the following features.

The failure of the primary power source can include at least one of a failure to provide operating power that meets a power requirement of the network switch, a complete power failure, a surge or sag in power output, or a high-voltage excursion from a normal output power. A second one of the at least two ports can be configured to connect to a second network interface of a second computing device through a second network cable. The second network cable can be configured to conduct operating power for the network switch. The second network interface can be able to draw electrical power from a power supply of the second computing device and provide, through the second network cable, at least a portion of the drawn electrical power as the operating power. The power management circuit can be coupled to the second port. The power management circuit can be configured to draw at least a portion of the operating power from the second port, and power the switching circuit using the drawn power from the second port responsive to the detected failure of the primary power source.

The power management circuit can be further configured to draw power from both the first and second ports such that a total amount of power drawn from the first and second ports is sufficient to meet a power requirement of the network switch. The power management circuit can be configured to draw a substantially equal amount of power from each of the first and second ports. The power supply of the computing device can include an uninterruptible power supply (UPS) coupled to the first computing device. The network switch can further include a controller coupled to the power management circuit. The controller can be configured to receive information on the UPS coupled to the first computing device, the information reflecting an amount of charge remaining in the UPS. The controller can also be configured to control the power management circuit such that an amount of electrical power drawn from the first computing device varies in accordance with an amount of charge remaining in the UPS. The controller can also be configured to receive power usage information from the first and second computing devices, the power usage information indicating that the first computing device is consuming more power than the second computing device. The controller can be configured to control the power management circuit such that an amount of electrical power drawn from the second port is greater than an amount of power drawn from the first port. The controller can be further configured to control the power management circuit such that an amount of electrical power drawn from a given one of the ports varies inversely with a corresponding power usage of a computing device connected to the given port. The power management circuit and the controller can reside in a housing of the network switch. The communication medium can be a network cable. The network cable can be an Ethernet cable or an optical fiber with a conducting portion.

The computing device can include a power connection configured to receive power from the primary power source and provide power to the computing device. The power supply can include a backup power source configured to provide power to the computing device when the primary power source fails to provide the computing device with power that meets a power requirement of the computing device.

The system can include at least a second computing device connected to a second port on the network switch via a second network cable configured to conduct operating power. The system can also include a controller coupled to the power management circuit. The system can also include a generator configured to provide power to the network switch in case of a power failure, the generator further configured to start up using the operating power drawn by the power management circuit.

The method can further include using the drawn electrical power to trigger a secondary power source configured to power the network switch. The method can also include terminating the drawing of the electrical power from the network cable in response to detecting that at least one of the primary or secondary power sources is providing the power requirement of the network switch. The method can include receiving, by a controller coupled to the power management circuit, power usage information from the computing devices, and controlling the power management circuit such that electrical power drawn from a network cable connected to a given computing device varies inversely with a corresponding power usage of the computing device.

Implementations of the techniques described in this document can offer several advantages. For example, functioning of a network switch during a power outage can be made at least as reliable as that of the computing devices connected to the switch. Dependence on a secondary power source for the network switch can be reduced or even eliminated. By using network cables that connect computing devices to the switch, the system can be implemented with minimal additional hardware modifications. Power from multiple computing devices, which is otherwise unused, can be utilized to provide back-up power to the switch at least temporarily during a power outage, or even used to start up a more permanent back-up power source such as a generator.

Implementations of the described techniques can include hardware, a method or process, or computer software on a computer-accessible medium. The details of one or more implementations are set forth in the accompanying drawings and the description below. Other features and advantages will be apparent from the following detailed description, and from the claims.

DETAILED DESCRIPTION

A network switch provides connectivity between machines or computing devices connected to the switch. The network switch can receive operating power from a primary power source such as a power outlet connected to a power supply network. Communication between the computing devices can be routed through the network switch and therefore it is desirable for the network switch to be operational even during power outages. In various implementations, the backup power for a network switch is drawn from the computing devices connected to the switch, for example, through the network cable connecting the computing devices to ports of the network switch. The computing devices are coupled to one or more secondary power sources (for example, a UPS) that can provide power to the computing devices during a power outage, which allows the computing devices to provide power to the network switch during the power outage. For instance, in some implementations, each computing device can have a UPS that provides backup power to the computing device and, during a power outage, Power Over Ethernet (POE) can be used to provide power from the computing devices to the network switch over the network cables. During such outages, relying on a dedicated secondary power source (such as an uninterruptible power supply (UPS)) to provide requisite operating power to the network switch renders the functioning of the switch heavily dependent on the reliability of the particular secondary power source. Using additional sources of secondary power adds to the cost of the overall system.

Figure 1A:
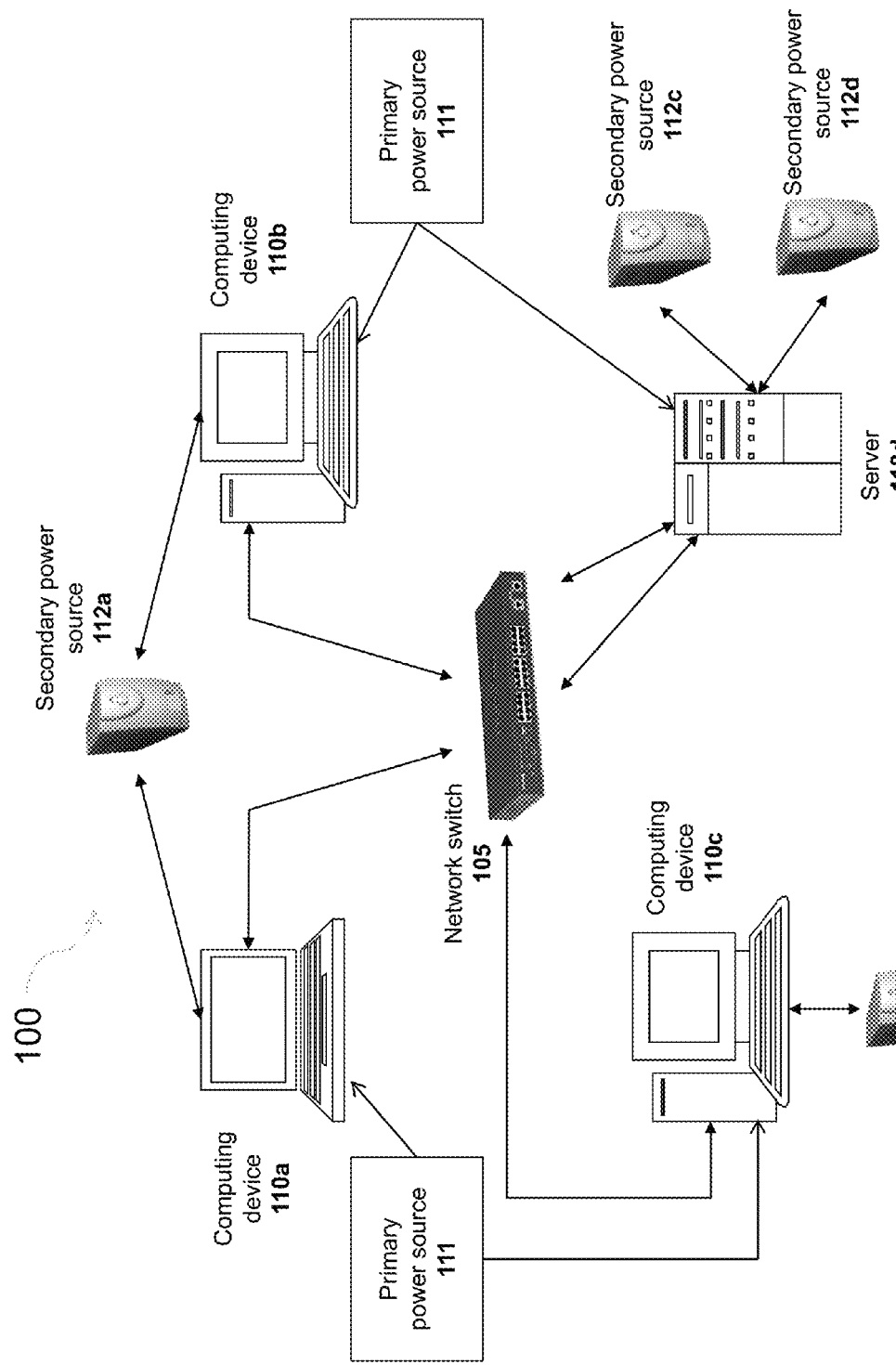
FIG. 1A is a schematic diagram showing an example of a network in which back-up power is provided to a network switch.

FIG. 1A is a schematic diagram showing an example of a network 100 that provides backup power to a network switch. The network 100 includes one or more computing devices (110a-110d, 110 in general) connected to a network switch 105. The computing devices 110 are each connected to at least one secondary power source (112a-112d, 112 in general), such as an UPS, to provide backup power during power outages. In some cases, a computing device 110c can be connected to a dedicated secondary power source 112b. In other cases more than one computing devices 110a and 110b can be connected to one secondary power source 112a. In some implementations, a given computing device 110 can be connected to more than one secondary power source 112. For example, a server 112, connected to the network switch 105, can have multiple secondary power sources 112c and 112d. The computing devices 110 and the network switch 105 can be powered from a primary power source under normal operating conditions. In some examples, the primary power source for each of the devices and the switch is a power outlet supplying power from an electric supply company. When the primary power source fails to provide adequate operating power for a given device or switch, the condition is known as a power outage. The secondary power sources 112 provide backup power to the respective computing devices during power outages.

Providing backup power to the network switch 105 allows for proper functioning of the network 100 during a power outage. In network 100, the backup power for the network switch 105 is drawn from one or more of the computing devices 110 connected to the network switch 105. This way, the functioning of the network switch 105 during a power outage is at least as reliable as that of the computing devices 110 connected to the switch 105.

In general, during a power outage, a device is dependent on the corresponding secondary power source 112 to provide operating power for the device. If a secondary power source 112 fails during a power outage, only the devices 110 that are connected to the particular secondary power source 112 are affected. For example, if the secondary power source 112b fails, only the computing device 110c will be affected during a power outage. The other computing devices 110 will continue to function properly as long as the corresponding secondary power sources 112 continue to provide the requisite operating power. In contrast, if the backup power source for the network switch 105 fails, proper functioning of the entire network 100 can be affected because the computing devices 110 will not be able to communicate with each other even if they continue to function individually. If the network switch 105 depends on a dedicated backup power source, the functioning of the entire network depends on the reliability of the particular backup power source. In contrast, providing backup power from the computing devices 110 connected to the network switch 105 can ensure that the network switch 105 is at least as reliable as that of the computing devices 110 connected to the switch 105 during a power outage.

In network 100, several computing devices 110 connected to the network switch 105 are available to provide the backup power and therefore only a fraction of the backup power for the network switch 105 is drawn from each of the computing devices 110. Each computing device 110 connected to the network switch 105 typically has surplus power available during a power outage to contribute to the backup power for the network switch 105. This can be due to, for example, a given computing device 110 consuming less power than that provided by a corresponding secondary power source 112 during a power outage. Because the probability of the requisite backup power not being available from at least some of the multiple computing devices 110 is typically low, the reliability of the network switch 105 during a power outage can be increased significantly as compared to using a dedicated backup power source for the network switch 105. In general, as long as any appropriate combination of the computing devices 110 connected to the network switch 105 can provide the requisite operating power for the switch, the functioning of the network 100 remains unaffected during a power outage. The computing devices 110 can provide the backup power for the network switch from a primary power source (if available) or a corresponding secondary power source 112.

The network 100 connecting the computing devices 110 to the network switch 105 is a wired network, with suitable media such as connecting cables configured to conduct data as well as electrical power. In some implementations, the network 100 can also be a wireless network. The network 100 can include one or more different network types. For example, the network 100 can include a local area network (LAN), such as a company intranet or a home network, a metropolitan area network (MAN) or a wide area network (WAN). In some implementations, the network 100 can include a combination of one or more different types of network. For example, a LAN such as a home network can be connected to an external access network. The network 100 can be of different types and form and can include one or more of the following: a point to point network, a computer network, a power line network, an optical network such as a Synchronous Optical Network (SONET), and a Synchronous Digital Hierarchy (SDH) network. The connections within the network 100 can include one or more of the following: coaxial cable, telephone wires, power line wires, twisted pair wires, Ethernet cables, optical fibers with metal shields, Universal Serial Bus (USB) wires or any other form and type of wire capable of conducting electrical power in addition to data. The topology of the network 100 can be a bus, star or a ring topology or any other topology capable of supporting the operations described herein.

The network switch 105 is a networking device that connects various computing devices 110. The network switch 105 has one or more ports that are used to receive connections from various computing devices 110. In some implementations, the network switch 105 can be an active device that implements data traffic management functionalities such as load balancing and address translation. In some implementations, network switch 105 can be a passive network device such as a hub or a repeater that simply routes data traffic between the multiple ports. In some implementations, the network switch 105 can be configured to connect to different types of networks, for example, an Ethernet network, a Digital Subscriber Line (DSL) network, a telephone network or a fiber-optic network. In some implementations, the network switch 105 can interface between traffic from one type of network connection (for example, DSL) to another (for example, Ethernet).

In some implementations, the network switch 105 can operate on various layers of the open system interconnect (OSI) model. For example, the network switch 105 can operate on one or more of the physical, data link, network or transport layer of the OSI model. In such cases the network switch 105 can also be referred to as a multilayer switch. For example, the network switch 105 can operate as a hub or repeater at the physical layer or as a network bridge at the data link layer. In some implementations, the network switch 105, when used in an Ethernet network, can support the power over Ethernet (PoE) technology that allows electrical power to be transmitted along with data over Ethernet cables. Alternatively, or additionally, the network switch can support the use of optical fiber with a conducting cable for transmitting electrical power. The network switch 105 can also include internal or external circuitry to manage electrical power received at the multiple ports via the network connections.

The secondary power sources 112 provide backup power to the computing devices 110 when the corresponding primary power sources fail to provide the requisite operating power. A secondary power source 112 can also provide protection from other power supply irregularities such as surges, sags, spikes, noise, frequency instability and harmonic distortion. In some implementations, the secondary power source 112 can be a UPS that provides substantially instantaneous protection from power interruptions due to a failure of the primary power source. A secondary power source 112 can include one or more batteries or cells and associated circuitry. In some implementations, a secondary power source 112 can include an auxiliary power generating device such as a generator or a flywheel to provide higher amount of backup power and/or to provide backup power for long durations. A secondary power source 112 can also include a UPS and an auxiliary power generating device such as a generator. In such cases the UPS provides immediate backup power during a power outage while a generator, which may start after a short period of time, provides more sustained backup power. In some implementations, a UPS can be used to provide the power required to start up a generator.

In some implementations, a secondary power source 112 includes an automatic transfer switch that senses a power outage and transfers the electrical load of a corresponding computing device 110 to the secondary power source 112. After primary power is restored, the automatic transfer switch transfers the electrical load back to the primary power source. In some implementations, such an automatic transfer switch can also be implemented as a part of the computing device 110 or an external module.

A computing device 110 can include, for example, a desktop or a laptop computer or a handheld device capable of connecting to a wired network. In some implementations, the computing device 110 can be a server 110d. In some implementations, a computing device 110 can be a modular device, which in combination with other similar devices 110, form a larger unit. For example, the computing devices 110 can be a part of a computer data center implemented as an ensemble of one or more "racks." In such cases, each rack includes a number of modular rack mounted bases or trays, with each tray including a computing device 110.

Figure 1B:
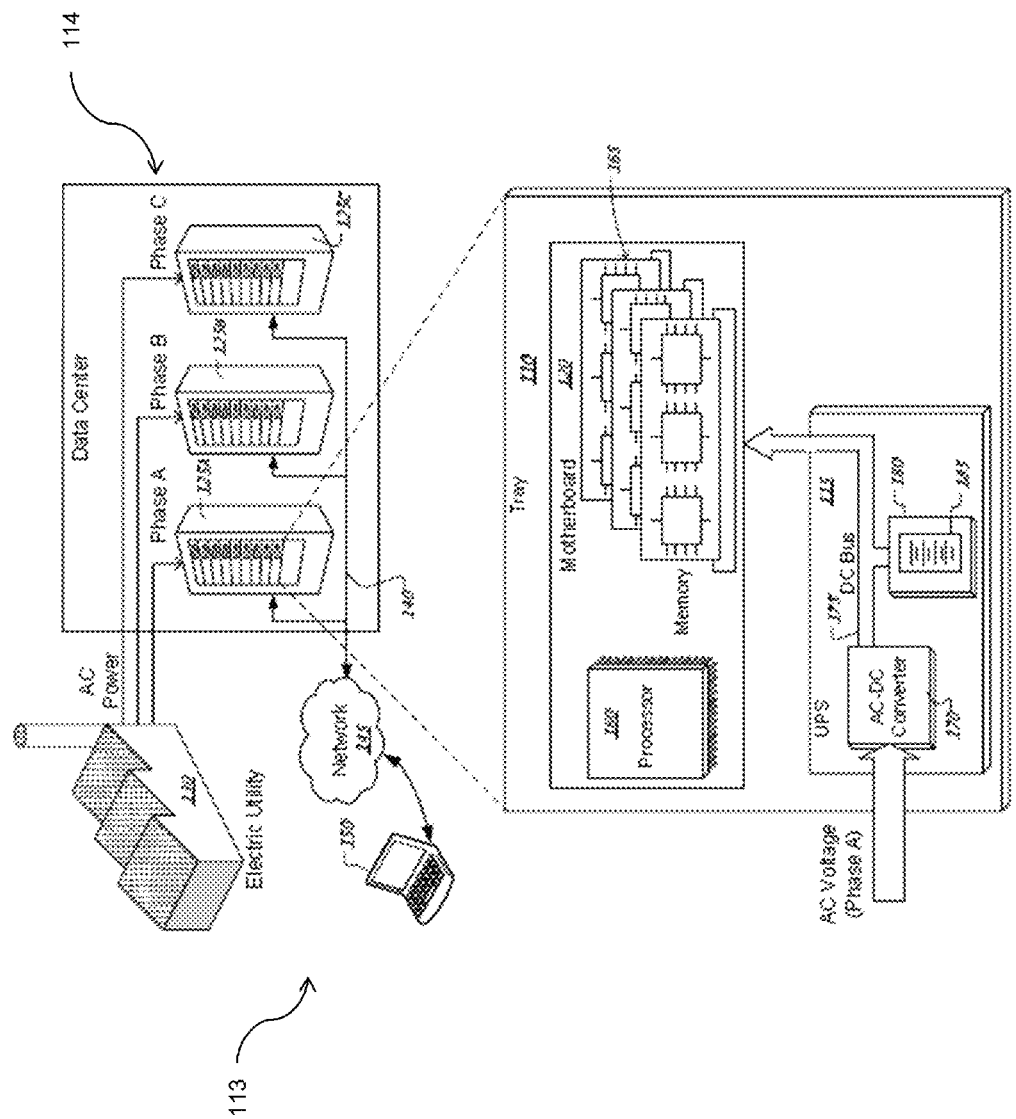
FIG. 1B is a schematic diagram illustrating an example of a power distribution architecture for a data center in which each of a number of modular rack-mounted trays includes an uninterruptible power supply (UPS) integrated with a computer motherboard.

FIG. 1B is a schematic diagram illustrating an example of a power distribution architecture 113 for a data center 114 in which each of a number of modular rack-mounted bases (which may also be referred to as trays) 110 includes an uninterruptible power supply (UPS) 115 operating to power components on a computer motherboard 120. In some implementations, at least some of the trays can be connected to one another via a network switch substantially similar to the network switch 105 described with reference to FIG. 1A. In general, a primary power source, such as an electric utility 130, provides operating power to the data center and the network switch. The trays are configured such that, when a primary power source fails to provide operating power to the network switch, at least a portion of the requisite operating power for the network switch can be provided from the UPS 115 to the network switch through a network cable connecting a network interface of the motherboard 120 to a port of the network switch.

In the depicted example, the data center 114 includes a number of racks 125A, 125B, 125C that contain a number of the trays 110. The racks 125A-125C can be powered by three-phase alternating current (AC) power that is delivered to the data center 114 from an electric utility 130. In some implementations, the electric utility 130 serves as the primary power source for the trays as well as the network switch providing connectivity between trays. The AC power delivered to each of the racks 125A-125C can originate from a rotating generator operated by the electric utility and driven by a steam or gas turbine, for example. The AC voltage signals, which are substantially sinusoidal, can be transmitted to a distribution point, such as a substation (not shown) in the utility grid, for example. The power line voltages (e.g., 480 V line-to-line) can be distributed from the substation to the data center 114.

In some examples, the data center 114 draws a large amount of power from the electric utility 130. For example, each server system in the data center 114 can consume 100 W-500 W of power. For example, each of the racks 125A-C can consume 2 kW to 30 kW of power. A small data center can provide, for example, 5000 processors, each having one or more cores. As processor technology improves, each processor or core can draw less power, but the number of cores per processor can increase. Larger data centers can employ many more processors, including 10,000, 20,000, 50,000, or even 100,000 processors. These can be distributed in racks having, for example, 20, 30, or 40 processors per rack.

Each of the trays 110 in the depicted example is coupled to a network connection 140. The network connection 140 provides an information channel to a network 145, which can include, for example, a local area network, virtual private network, wide area network (e.g., the Internet), or a combination of such networks, which can be wired, fiber optic, and/or wireless. A remote computer 150 represents one of many possible devices that could communicate data directly or indirectly with one or more trays to access, store, process, and/or retrieve information using a processor 160 and associated memory 165 on the motherboard 120. In some implementations, additional processors (e.g., servers) can facilitate such communication. For example, the exemplary remote computer device 150 can be included in a server, a desktop computer, a laptop computer, and/or a handheld processor-based device. One or more servers can pre- or post-process, supervise, route, and/or balance the flow of data associated with the communication.

In some examples, the motherboard 120 can include two, three, four, or any other practicable number of processors 160. In some embodiments, the motherboard 120 can be replaced with or augmented by a tray of data storage devices (e.g., hard disc drives, flash memory, RAM, or any of these or other types of memory in combination). In such embodiments, the UPS 115 with the battery 185 can be integrated with the data storage devices and supported on the tray 110.

In some examples, a digital processor can include any combination of analog and/or digital logic circuits, which can be integrated or discrete, and can further include programmable and/or programmed devices that can execute instructions stored in a memory. The memory 165 can include volatile and/or non-volatile memory that can be read and/or written to by the processor 160. The motherboard 120 can further include some or all of a central processor unit(s) (CPU), memory (e.g., cache, non-volatile, flash), and/or disk drives, for example, along with various memories, chip sets, and associated support circuitry.

In some embodiments, the tray 110 can include a network interface card that is configured to provide an interface between the motherboard 120 and a network switch. The network interface card can be configured to draw power (for example, surplus power during a power outage) from the UPS 115 and make the drawn power available as backup power for the network switch.

In some implementations, the processor 160 and the memory 165 on the motherboard 120 can form at least a part of a processing system configured to handle network operations. As an example, the motherboard 120 can help to process Internet requests. The motherboard can process information either alone or in combination with other parallel processes running on other processor-based devices, such as one or more other trays 110 in the data center 114.

An AC input voltage signal that is delivered to each of the trays 110 is processed by the UPS 115. In some examples, the AC input voltage signal can be received from the AC mains. The UPS 115 includes an AC-to-DC converter 170 that converts the AC input voltage signal to a regulated direct current (DC) voltage. The converter 170 outputs the regulated DC voltage onto a DC bus 175. In some embodiments, the AC-to-DC converter 170 can regulate the DC voltage to a static set point, for example, 12V DC.

If the AC input voltage signal falls outside of a normal range (e.g. 100-140V), such as during a fault condition, or a power outage, a detection circuit (not shown) can send a signal indicative of this condition. In response to detecting the fault condition, a battery circuit 180 can be configured to connect a battery 185 across the DC bus 175 so that the motherboard 120 can continue to operate substantially without interruption. The battery 185 can continue to provide operating power to the circuits on the motherboard 115 until the battery 185 substantially discharges. The battery circuit 180 can include circuitry capable of controlling the charging and/or discharging the battery across the DC bus 175 in various operating modes. In some examples, the battery 185 can supply more power than what is consumed by the motherboard 120 and other circuitry on the tray 110. In such cases, the surplus power can be made available at a port of a network interface card on the tray 110 such that the surplus power can be used as backup power for a network switch connected to the motherboard 120 via the network interface card.

Figure 2:
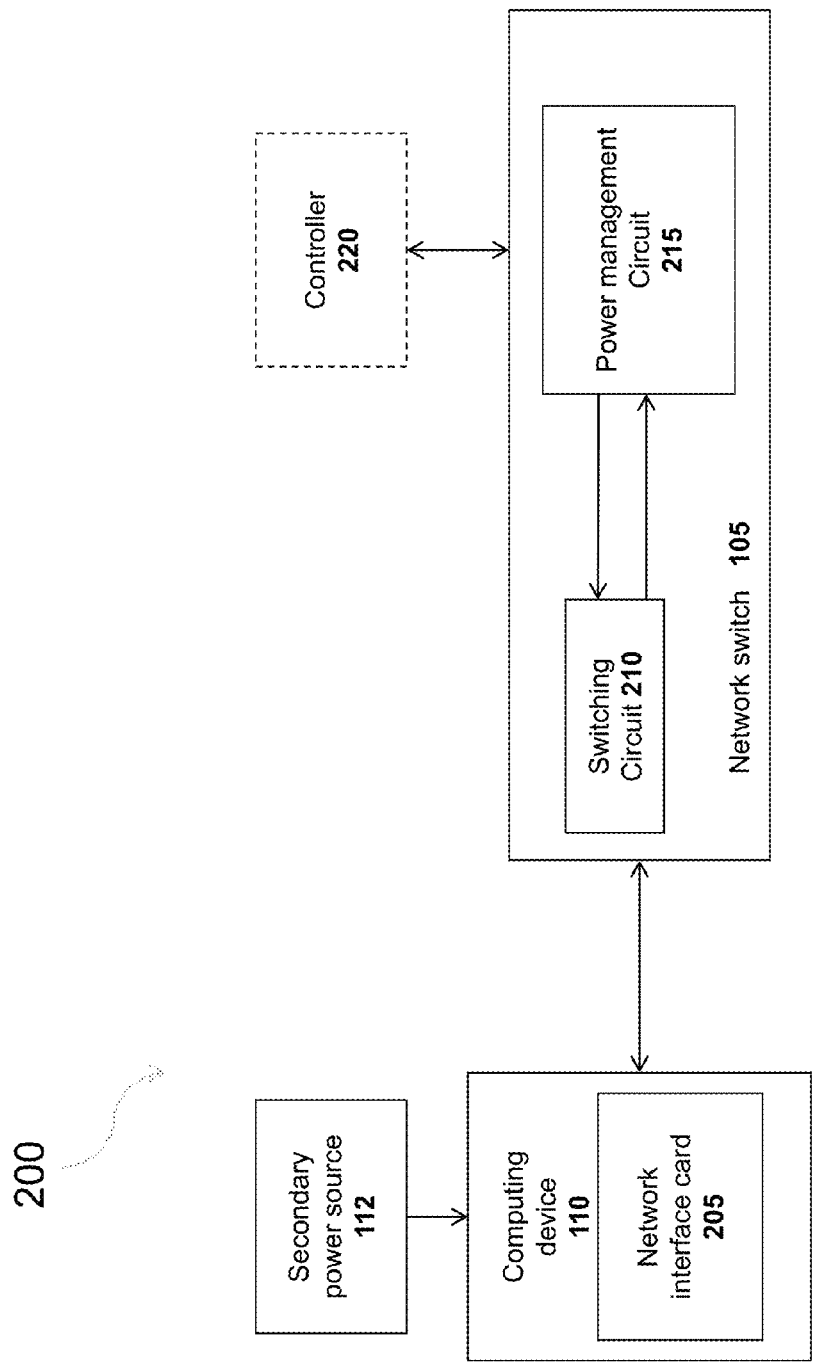
FIG. 2 is a schematic diagram showing an example of a system for providing back-up power to a network switch.

FIG. 2 is a schematic diagram showing an example of a system 200 for providing back-up power to a network switch 105. The system 200 includes a network switch 105 connected to the computing device 110. The computing device 110 is connected to one or more power sources that include a primary power source 111 (for example, an electric utility 130 as described in connection to FIG. 1B) and a secondary power source 112. The computing device 110 includes a network interface card 205 that facilitates the connection between the computing device 110 and the network switch 105. The network switch 105 includes a switching circuit 210 that is configured to route network data between the multiple ports of the network switch 105. The network switch 105 also includes a power management circuit 215. The power management circuit 215 is configured to manage electrical power received at the ports of the network switch 105 from one or more computing devices 110. For example, the power management circuit 215 can be configured to provide backup power to the network switch 105 by using electrical power received at the ports of the network switch 105. In some implementations, the system 200 can include a controller circuit 220 connected to the power management circuit 215 to facilitate "smart" functionalities of the power management circuit 215 thereby allowing more control over the way electrical power is drawn from multiple ports of the network switch 105. For example, when multiple computing devices 110 are connected to the ports of the network switch 105, the controller circuit 220 can be used to intelligently determine a distribution of drawn power from the different ports based on power usage information of the devices 110 connected to the ports.

The network interface card 205 is a device that interfaces between the computing device 110 and a network to which the device 110 is connected. In some implementations, the network interface card 205 can include an identifier stored, for example, on a read-only memory (ROM). In some implementations, when the network switch 105 is in the data link layer of the OSI model, the identifier is referred to as a medium access control (MAC) address. In such cases, the MAC address identifies the device uniquely in a network.

The network interface card 205 can include one or more ports for facilitating a connection of the computing device 110 with the network switch 105. In some implementations the network interface card 205 include one or more of the following ports: an Ethernet port, and IEEE 1394 (FireWire®) port, and optical port, a Fibre Channel port, a Fibre Channel over Ethernet (FCoE) port, a Universal Serial Bus (USB) port, a Peripheral Component Interconnect (PCI) port, and a Serial Advanced Technology Attachment (SATA) port. The ports on the network interface card 205 can be configured to handle half duplex or full-duplex connections.

In general, at least some of the ports on the network interface card 205 include connections that are coupled to either a primary or secondary power source of the computing device 110. Wires connected to such ports can therefore draw electrical power from at least one of the primary and/or secondary power sources of the computing device 110. In some implementations, at least some of the ports on the network interface card 205 can also include connections configured to receive electrical power through the ports and make the received electrical power available for use as operating power for at least some parts of the computing device 110. For example, the network interface card 205 can include an Ethernet port that facilitates the Power over Ethernet (PoE) technology. In some implementations the network interface card 205 can include some ports that facilitate both transmission and reception of electrical power. Typically a computing device 110 consumes less power than what the secondary power source 112 can provide. The excess power can therefore be made available at the ports of the network interface card 205. For example, a computing device 110 can require, on average, about 600 W of electrical power while the secondary power source 112 connected to the computing device 110 provides about 750 W of power. In this case, the additional 150 W can be made available at one or more ports of the network interface card 205. In some implementations, a fixed amount of electrical power can be made available at a port of the network interface card 205. The electrical power made available at the ports of the network interface card 205 can also be drawn from a primary power source (if available) of the computing device 110. Electrical power made available at the one or more ports can be conducted via a suitable network cable to be used as operating power for the network switch 105.

The network switch 105 typically includes a switching circuit 210 that facilitates interconnection between various computing devices 110 connected to the different ports of the network switch 105. In some implementations, the switching circuit 210 can be configured to provide interconnections between different types of ports. For example, the switching circuit can be configured to provide a connection between a DSL port and one or more Ethernet ports. Similarly, in some implementations, the switching circuit 210 can provide the connection between an optical port and one or more Ethernet ports. The switching circuit 210 can also include circuitry to switch received electrical power between the ports of the network switch 105. The switching circuit 210 is coupled to the power management circuit 215, which manages the received electrical power at the different ports.

The power management circuit 215 manages the electrical power received at the different ports of the network switch 105 to provide operating power for the network switch 105. In some implementations, the network switch 105 has a dedicated primary power source and the power management circuit 215 provides backup power only when the dedicated primary power source fails to provide adequate operating power to the network switch 105. In other implementations, the power management circuit 215 acts as the primary power source for the network switch 105.

The power management circuit 215 includes circuitry to accumulate the power drawn from the different ports of the network switch 105 and to provide the accumulated power as operating power for the network switch 105. For example, the power management circuit 215 can draw power from the ports and use the drawn power to power the switching circuit when the primary power source fails to provide power that meets a power requirement of the network switch. For example, if the primary power source fails to provide a power requirement of 100 W, the power management circuit can draw 5 W each from 20 different ports and use the aggregated 100 W to power the network switch.

In some implementations the power management circuit 215 is externally coupled to the network switch 105. In other implementations, the power management circuit 215 resides within the network switch 105. Regardless of whether the power management circuit 215 is the primary or secondary power source for the network switch 105, additional backup power sources can also be provided for the network switch 105. For example, an UPS or a power generating device such as a generator can be connected to the network switch 105 as an additional backup power source. In some implementations, the power management circuit 215 can be configured to also provide operating power to the additional backup power source. For example, the power management circuit 215 can draw power from the ports and use that power to provide startup power to a generator, possibly in addition to providing backup power to the network switch 105.

In general, the power management circuit 215 draws electrical power received at the ports of the network switch 105 such that the total power drawn from the different ports is at least sufficient to provide operating power for the network switch 105. When used as a backup power source for the network switch 105, the power management circuit 215 can be configured to draw adequate power from the ports of the network switch 105 to cover a deficiency due to the failure of a primary power source. The power management circuit 215 can draw the required power from the different ports of the network switch 105 in various ways. In some implementations, the power management circuit 215 can be configured to draw an equal amount of power from each port that is connected to the computing device 110. For example, if the network switch 105 needs 200 W of backup power and is connected to 40 computing devices 110, the power management circuit 215 can be configured to draw 5 W of electrical power from each of the corresponding ports on the network switch 105. In some implementations, the power management circuit 215 can be configured to draw predetermined amounts of electrical power from different ports. For example the power management circuit 215 can be configured to draw 5 W from a first port and 7.5 W from a second port even if more power is available at the respective ports.

In some implementations, a controller circuit 220 can be used to provide additional flexibility and control over the ways in which the power management circuit 215 draws electrical power from the ports of the network switch 105. In some implementations, the controller 220 determines a distribution of power drawn from various ports of the network switch 105. In some implementations, the controller 220 can be used to determine a subset of ports of the network switch 105 from which the power management circuit 215 draws electrical power. For example, the subset of ports can be determined based on information regarding the computing devices 110 connected to the ports. In some implementations, the subset of ports can be determined based on the power usage information of the computing devices 110 connected to the ports. The subset of ports can also be determined based on central processing unit (CPU) loads of the computing devices 110 connected to the ports. For example, if it is determined that certain computing devices are consuming electrical power over a predetermined threshold (e.g. 300 W), the controller 220 can be configured to instruct the power management circuit 215 not to draw electrical power from the ports at which those computing devices 110 are connected. Similarly, if it is determined that CPU loads for a group of computing devices are over a predetermined threshold (e.g. 2000 W), the controller 220 can instruct the power management circuit 215 not to draw electrical power from the respective ports at which such computing devices are connected.

In some implementations, the control circuit 220 can determine a distribution of drawn electrical power from different ports based on the CPU loads and/or the power usage information from the different devices. For example, the controller 220 can instruct the power management circuit 215 to draw electrical power from a given port wherein the drawn power from that port is inversely proportional to the CPU load and/or power usage of the computing device 110 connected to the given port. This can result, for example, in power being drawn from a first port being greater than the power drawn from a second port, for instance, when CPU load or power usage of a computing device 110 connected to the first port is lower than that of a computing device 110 connected to the second port. The controller 220 can also determine how much electrical power should be drawn from a given port based on other information such as remaining charge of the secondary power source 112 responding to the computing device 110 connected to the given port. For instance, the controller 220 can control the power management circuit 215 such that an amount of electrical power drawn from a given computing device 110 varies in accordance with an amount of charge remaining in the secondary power source 112. As another example, the controller 220 can determine not to use certain ports based on the amount of network traffic on the ports. In such a case, if a given port is determined to have, at a given instant of time, network traffic over a predetermined threshold (e.g. 200 Mbps), the controller 220 can instruct the power management circuit 215 not to draw power from that particular port.

The controller 220 can be implemented as a hardware module, a software module executing on a computing device such as a microcontroller, or a combination of hardware and software. In some implementations, the controller 220 can be an external module in communication with the network switch 105. In other implementations, the controller 220 can be integrated within the power management circuit 215 or the network switch 105. In general, the controller 220 receives information (for example, CPU load or CPU power usage) from the network switch 105 regarding the computing devices 110 connected to the network switch 105. Furthermore, although a number of discrete modules are depicted in connection with FIG. 2, the functionality of such modules can overlap and/or exist in a fewer or greater number of modules, which can be implemented in hardware and/or software and which can be geographically dispersed.

The information about the computing devices 110, which is provided to the controller 220, can be collected in a variety of ways. In some implementations, the connecting cable between the computing device 110 and the network switch 105 can be used to transmit the information about the computing device 110. For example, the amount of power made available by the computing device 110 can be an indication of the corresponding power usage information. In such a case, an amount of power made available by the computing device 110 can be inversely proportional to the power usage of the device. For example, a device can have 10 W available at near-zero load, 5 W at half of full-capacity load and 2.5 W at three quarters of full-capacity load. In another example, the connecting cable can be configured to carry information, for example, a flag, that indicates that the power usage, or CPU load of the computing device 110 is above (or below) a predetermined amount or threshold. In some implementations, hardware on the computing device 110 can be used to measure the relevant information, such as the power usage and/or CPU load information and send such information as part of the data over the network cable, or as a signal over the portion of the network cable that carries the power. For example, a software module on a computing device 110 can measure the CPU load or the CPU power usage, and send the measured amount as data over the portion of the network cable that carries network data packets. Alternatively, or additionally, for instance, hardware on a computing device 110 can measure the CPU load or the CPU power usage, and send the measured amount encoded as a 1-5V signal over the cabling in the network cable that transfers the power. In various implementations, dedicated hardware and/or software modules, which can reside on the computing device 110 or elsewhere in the network, can also be used to collect such information.

Figure 3:
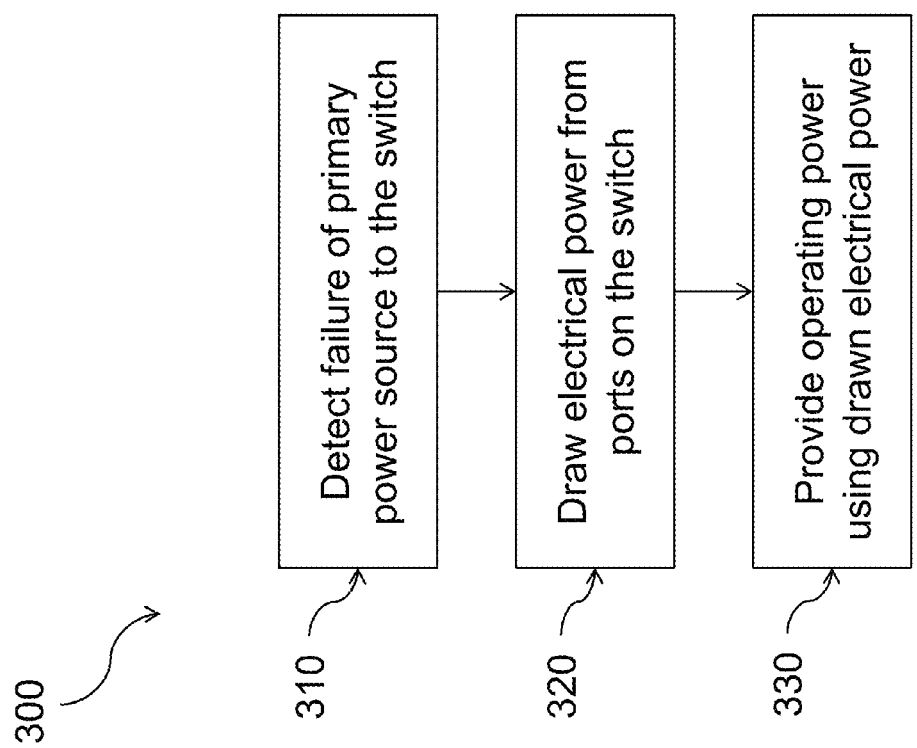
FIG. 3 is a flow diagram of an example of a process to provide back-up power to a network switch.

FIG. 3 is a flow diagram 300 of an example of a process to provide back-up power to a network switch. Operations can include detecting failure of a primary power source providing power to a network switch (310). The failure of the primary power source, for example, can include one or more of the following: complete failure to provide operating power to the network switch, providing an unexpected increase (surge) or decrease (sag) in power output, providing high-voltage excursion from the normal output power (spike), or exhibiting any other aberrations that affect the operation of the network switch. Detecting the failure of the primary power source can be done, for example, by monitoring the incoming power from the primary power source and determining if a certain characteristic (e.g. a mean square value of the corresponding voltage) falls above or below a predetermined threshold (e.g. 100V for a 110V AC system). Such monitoring can be done, for example, at a power connection of the network switch that is configured to receive power from a primary power source. Circuitry to detect the failure of the primary power source can be implemented as an external module, or as part of the circuitry within the network switch 105.

Operations also include drawing electrical power from one or more ports on the switch (320). Each of the one or more ports is connected through a network cable to a network interface of a computing device 110. The network cable is configured to conduct operating power and the network interface is able to draw electrical power from a power supply of the computing device and provide, through the network cable, at least a portion of the drawn power as operating power for the network switch.

In general, the electrical power can be drawn from the one or more ports by the power management circuit 215, described with reference to FIG. 2. The electrical power can be drawn from the one or more ports based on instructions from the controller 220 in communication with the power management circuit 215. The drawn electrical power is accumulated by the power management circuit 215 and can be drawn from multiple ports such that a total amount of power drawn from the multiple ports is sufficient to meet the power requirement of the network switch.

In some implementations, the electrical power is drawn from the one or more ports after the network switch 105 switches to, or selects, the power management circuit 215 to provide backup power to the network switch 105. Electrical power can be drawn from the one or more ports in a variety of ways. For example, a substantially same amount of power can be drawn from each of the ports to which a computing device 110 is connected and adequate power is made available. In some implementations, electrical power drawn from a given port can be predetermined. In some implementations, the power management circuit 215 powers the network switch using the drawn power when a primary power source fails to provide power that meets a power requirement of the network switch.

Operations further include providing operating power to the network switch using the drawn electrical power (330) from a port of the network switch. The drawn electrical power is provided to components of the network switch such that the network switch continues to operate for a period of time after the detection of the failure. The operating power can be provided either as primary power or backup power. The operating power is provided as backup power when the primary power source fails to provide power that meets a power requirement of the network switch. When the power is provided as a backup power, operations can also include the network switch selecting the power management circuit 215 (over a primary power source) to receive operating power. Such selection can be done, for example, using a multiplexing circuit in the network switch. Drawing of the electrical power from the network cable can be terminated in response to detecting that at the primary or secondary power source is directly providing the power requirement of the network switch.

The operations described above can be implemented using any appropriate hardware or software module or a combination thereof. In some implementations, different operations can be executed in different parts of the network. For example, detecting failure of the primary power source to the switch can be done using circuitry in the network switch 105 whereas the circuitry to draw electrical power from the ports to provide operating power to the network switch 105 can be implemented in a power management circuit 215 residing at a remote location from the network switch 105. If software modules are used for providing instructions to carry out any of the above operations, such modules can be implemented in any computing device in communication with the corresponding circuit performing the operation.

Figure 4:
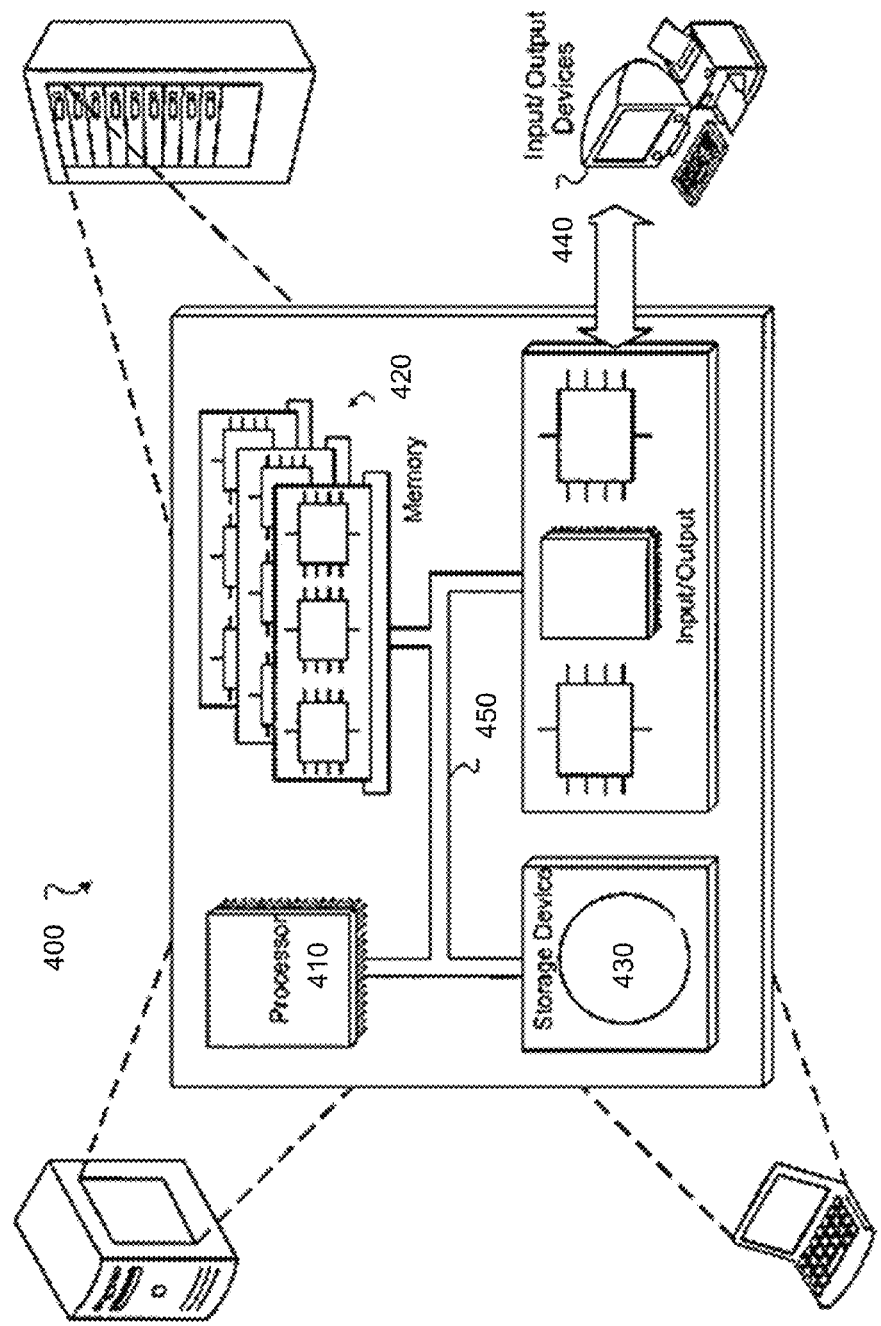
FIG. 4 is an illustration showing an example of a computing device.

FIG. 4 is a block diagram of computing device 400 that can be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers including various forms of mobile devices, such as personal digital assistants, cellular telephones, smart phones, and other similar computing devices that can be configured to be included in a network with other computing devices. The system 400 can be used for the operations described in association with any of the computer-implemented methods described herein, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 can include volatile memory and/or non-volatile memory.

The storage device 430 is capable of providing mass storage for the system 400. In one implementation, the storage device 430 is a computer-readable medium. In various different implementations, the storage device 430 can be a floppy disk device, a hard disk device, an optical disk device, or a tape device.

The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, or in combinations of them. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The computer system can include clients and servers. The relationship of client and server arises by virtue of computer programs running on the respective computers and having a client-server relationship to each other. A client and server are generally remote from each other and typically interact through a network as described above with reference to FIG. 1. The computer system 400 can also include a network interface card that facilitates the connection of the computer system 400 with another network device such as another computer system 400 or a network switch 105 described above with reference to FIG. 1.

The processor 410 carries out instructions related to a computer program. The processor 410 can include hardware such as logic gates, adders, multipliers and counters. The processor 410 can further include a separate arithmetic logic unit (ALU) that performs arithmetic and logical operations.

A number of implementations have been described. Nevertheless, it will be understood that various modifications can be made. Various forms of the flow shown above can be used, with operations re-ordered, added, or removed. For example, referring again to FIG. 3, the operation to detect failure of a primary power source can be omitted if the operating power to the network switch is primarily provided by drawing electrical power available at the ports of the switch. Also, although several applications of the systems and methods for providing back up power have been described, it should be recognized that numerous other applications are contemplated. For example, other network devices that are connected to various other resources capable of providing electrical power, can be provided with primary or back-up power using methods and systems described herein. Further, while wired networks have been described, the techniques may be applied to wireless networks (for example, power may be provided over a wireless link) Accordingly, other implementations are within the scope of the following claims.

What is claimed is:

1. A network switch comprising:
at least two ports, at least a first one of the ports being configured to connect to a first network interface of a first computing device through a communication medium configured to conduct operating power for the network switch;
a switching circuit configured to route network data between the at least two ports; and
a power management circuit coupled at least to the first port, the power management circuit configured to:
draw at least a portion of operating power from the first port, and
power the switching circuit using the power drawn from the first port,
wherein the switching circuit is configured to be fully operational solely using power drawn from one or more ports.

2. The network switch of claim 1, wherein the first network interface is configured to draw electrical power from a power supply of the first computing device and provide, through a network cable, at least a portion of the drawn electrical power as the operating power.

3. The network switch of claim 1 wherein a second one of the at least two ports is configured to connect to a second network interface of a second computing device through a second network cable configured to conduct operating power for the network switch, and wherein the power management circuit is coupled to a second port and is configured to:
draw at least a portion of the operating power from the second port, and
power the switching circuit using the drawn power from the second port.

4. The network switch of claim 3, wherein the second network interface is able to draw electrical power from a power supply of the second computing device and provide, through the second network cable, at least a portion of the drawn electrical power as the operating power.

5. The network switch of claim 3, wherein the power management circuit is further configured to:

draw power from both the first and second ports such that a total amount of power drawn from the first and second ports is sufficient to meet a power requirement of the network switch.

6. The network switch of claim 4 wherein the power management circuit is configured to draw a substantially equal amount of power from each of the first and second ports.

7. The network switch of claim 2 wherein the power supply of the computing device comprises an uninterruptible power supply (UPS) coupled to the first computing device.

8. The network switch of claim 7 further comprising:
a controller coupled to the power management circuit, the controller configured to:
receive information on the UPS coupled to the first computing device, the information reflecting an amount of charge remaining in the UPS; and
control the power management circuit such that an amount of electrical power drawn from the first computing device varies in accordance with an amount of charge remaining in the UPS.

9. The network switch of claim 5 further comprising:
a controller coupled to the power management circuit, the controller configured to:
receive power usage information from the first and second computing devices, the power usage information indicating that the first computing device is consuming more power than the second computing device; and
control the power management circuit such that an amount of electrical power drawn from the second port is greater than an amount of power drawn from the first port.

10. The network switch of claim 9 wherein the controller is further configured to:
control the power management circuit such that an amount of electrical power drawn from a given one of the ports varies inversely with a corresponding power usage of a computing device connected to the given port.

11. The network switch of claim 10 wherein the power management circuit and the controller reside in a housing of the network switch.

12. The network switch of claim 11, wherein the communication medium includes a network cable.

13. The network switch of claim 12, wherein the network cable is an Ethernet cable or an optical fiber with a conducting portion.

14. A system comprising:
a first computing device comprising a network interface circuit and a power supply;
a network switch comprising at least a first port connected to the network interface through a first network cable configured to conduct operating power, the network interface circuit being configured to draw electrical power from the power supply of the first computing device and provide at least a portion of the drawn electrical power to the first network cable as operating power, wherein the switching circuit is configured to be fully operational solely using power drawn from one or more ports; and
a power management circuit coupled to the first port on the network switch, the power management circuit configured to:
draw at least a portion of the operating power from the first port, and
power the network switch using the drawn power.

15. The system of claim 14 further comprising:
at least a second computing device connected to a second port on the network switch via a second network cable configured to conduct operating power; and
a controller coupled to the power management circuit, the controller configured to:
receive power usage information from the first and second computing devices, the power usage information indicating that the first computing device is consuming more power than a second computing device, and
control the power management circuit such that amount of electrical power drawn from the second network cable connected to the second computing device is greater than the amount of power drawn from the first network cable connected to the first computing device.

16. A method of providing uninterruptible power to a network switch connected to one or more computing devices, the method comprising:
drawing, by a power management circuit, electrical power from at least one network cable that is connected to a port of the network switch and a network interface of a computing device, wherein the electrical power drawn from the network cable is provided by a power supply of the computing device; and
providing the drawn electrical power to components of the network switch, such that the switching circuit is fully operational using the drawn electrical power, and without using power from a power supply.

17. The method of claim 16 further comprising terminating the drawing of the electrical power from the network cable in response to detecting that another power source is providing the power requirement of the network switch.

18. The method of claim 16 further comprising:
receiving, by a controller coupled to the power management circuit, power usage information from the computing devices; and
controlling the power management circuit such that electrical power drawn from a network cable connected to a given computing device varies inversely with a corresponding power usage of the computing device.

19. The method of claim 16 further comprising:
receiving, by a controller coupled to the power management circuit, information reflecting an amount of charge remaining in an uninterruptible power supply (UPS) coupled to a first one of the computing devices; and
controlling the power management circuit such that electrical power drawn from a network cable connected to the first computing device is in accordance with an amount of charge remaining in the UPS.

* * * * *